United States Patent [19]
Brown

[11] Patent Number: 5,161,486
[45] Date of Patent: Nov. 10, 1992

[54] HANDS-FREE DOG JOGGER APPARATUS

[76] Inventor: Steve M. Brown, Sabino Rd., West Bath, Me. 04530

[21] Appl. No.: 731,619

[22] Filed: Jul. 17, 1991

[51] Int. Cl.$^5$ .............................................. A01K 1/00
[52] U.S. Cl. ..................................... 119/109; 119/96
[58] Field of Search ........................ 119/109, 106, 96; 182/4

[56] References Cited

U.S. PATENT DOCUMENTS

| | | | |
|---|---|---|---|
| 1,551,932 | 9/1925 | Carver | 119/96 |
| 2,994,300 | 8/1961 | Grahling | 119/96 |
| 3,004,519 | 10/1961 | Weissman | 182/4 X |
| 3,104,650 | 9/1963 | Grahling | 119/96 |
| 3,295,501 | 1/1967 | Riley | 119/96 |
| 3,458,188 | 7/1969 | Infante | 182/4 X |
| 4,396,091 | 8/1983 | Anderson | 119/96 X |
| 4,667,624 | 5/1987 | Smith | 119/96 |
| 4,932,362 | 6/1990 | Birchmire, III et al. | 119/96 |
| 4,945,861 | 8/1990 | de Koning | 119/109 |
| 4,977,860 | 12/1990 | Harwell | 119/109 |
| 5,038,719 | 8/1991 | McDonough | 119/110 |
| 5,080,045 | 1/1992 | Reese et al. | 119/109 |

FOREIGN PATENT DOCUMENTS 72350  5/1949  Denmark .................................. 182/4

Primary Examiner—John G. Weiss
Assistant Examiner—Nicholas D. Lucchesi
Attorney, Agent, or Firm—Fish & Richardson

[57] ABSTRACT

A device for the restraint of an animal accompanying a person as that person is walking or jogging. The device provides for two-point attachment of a leash to the person's waist and permits the person to restrain a leashed animal while at the same time leaving the person's hands and arms free to swing. The device comprises a waistband system and a modified animal lead. The waistband system includes an adjustable waistband placed about the person, one attachment hook on the left side of the waistband and one attachment hook on the right side of the waistband. A flexible cord is affixed to each of the attachment hooks and the modified lead is detachably hooked to the flexible cord. The modified lead comprises a quick-release clasp, a lead of adjustable length and a hand-hold loop. The clasp hooks the modified lead to the flexible cord and the hand-hold loop permits the person to quickly get a firm grip on the lead affixed to a collar placed on the animal.

9 Claims, 3 Drawing Sheets

HANDS-FREE DOG JOGGER APPARATUS

BACKGROUND OF THE INVENTION

1. Field of the Invention

The invention relates to the field of devices for the restraint of an animal accompanying a walker, a jogger or a stroller. More particularly, the invention relates to a restraining device that permits the walker or jogger to control a leashed animal while at the same time leaving that person's hands and arms free to swing.

2. Description of the Prior Art

In the field of devices used to restrain animals—dogs in particular—as a person is walking, the hand-held leash is by far the most commonly used. Unfortunately, such leashes are unsuitable for the person who wants to bring a pet along for a jog or "power-walk." One of the problems associated with the use of the standard leash while walking or jogging is that the person must hold the leash with one hand. At the other end of the leash the animal pulls against the restraint, thereby placing stress on the hand and arm holding the leash. This stress on the person is not symmetrical, is not located in close proximity to the person's center of gravity, and may cause an imbalance. A related problem involves the movement of the animal. In most cases the animal moves from side to side in front of its human companion. This movement of the animal not only compounds the aforementioned stress on the person's arm, it also upsets the rhythm of the walker/jogger and, in fact, makes arm-swing extremely difficult. Finally, conventional leashes may cause discomfort to the animal as well. Just as the movement of the animal places stress on the walker or jogger, the movement of the walker places stress on the animal; the person's arm swinging may jerk the animal's head back and in other ways interferes with the animal's stride.

Prior art devices which provide for hands-free restraint of an animate object leave unsolved many of the problems associated with animal restraint while a person is power-walking or jogging. Harwell (U.S. Pat. No. 4,977,860) discloses a retractable leash wherein one end of the leash is attached to the animal and the other end is attached to the belt of the person. The focus of that design is on the human's ability to quickly detach the leash from the belt. The leash is then free to retract into a housing located on the animal's collar. Although not the primary focus of Harwell, one benefit of this design is that it enables the animal's handler to have both hands free while controlling the animal. For this reason, the strain exerted by the animal as it pulls against the leash occurs nearer the person's center of gravity than would otherwise occur if the leash were held in the person's hand. Nevertheless, the Harwell design is still not conducive to animal control while the human is running. This is due primarily to its use of a single-point attachment of the leash to the person's belt. Single-point attachment is unsuitable while one is exercising because the force exerted on the person's body by a straining animal is not symmetrical. As a result, any sudden change in direction by the animal is much more likely to throw the person off balance. The patents issued to Birchmire III, et al. (U.S. Pat. No. 4,932,362) and Smith (U.S. Pat. No. 4,667,624) also disclose hands-free restraining devices, although that is not their primary focus. Nevertheless, both devices comprise single-point contact of a leash or harness to the person's belt and would therefore be unsuitable for use by a jogger, a power-walker or a stroller.

Therefore, what is needed is an animal-restraining device that permits a person to control an animal while at the same time leaving that person's hands and arms free to swing as the person power-walks or jogs. Further, what is needed is an animal-restraining device that reduces the stress on the person caused by the movement of the animal, and at the same time reduces the stress on the animal caused by the movement of the person. Finally, what is needed is an animal-restraining device that provides for symmetrical loading of the stress exerted on the person by the animal such that the person will not be thrown off balance by sudden directional shifts made by the animal as it moves back and forth in front of the jogger, power-walker or stroller.

SUMMARY OF THE INVENTION

The present invention overcomes the disadvantages of the prior art restraining devices by combining a unique two-point attachment waistband system for the person, along with a modified lead for the animal. Through this combination the animal-restraining device of the present invention may be used to great advantage by a jogger, stroller or power-walker in that it: (1) provides for hands-free restraint; (2) reduces the stress on both the person and the animal while both are exercising; and (3) eliminates the possibility that the animal's movements will throw the person off balance.

One of the most important features of the present invention lies in the waistband system which is placed about the person. Specifically, the waistband comprises two attachment points by which an animal lead is connected to the waistband. One attachment point is located to the left of center at the front of the person's waist and the other is located to the right of center at the front of the person's waist. The attachment points may be incorporated into an adjustable belt suitable for use while exercising. Furthermore, the location of one of the attachment points on the belt is adjustable. The use of the two-point attachment enables the user to overcome one of the major deficiencies associated with the prior art devices by providing for symmetrical loading of the pulling force applied to the person by a straining animal. As a result, the person will not be thrown off balance by directional shifts made by the animal.

A novel feature of the present invention comprises the interface between the waistband system and the animal lead. This feature, which is needed in order to further minimize the problems associated with the single-point attachment devices of the prior art, is a flexible cord. This flexible cord, which may be some type of shock cord or the like, connects the two-point attachment of the present invention with the animal lead. A flexible cord is preferable over a rigid one because it greatly reduces the force at any instant arising from a sudden movement of either the person or the animal. The cord is first affixed to each of the attachment points of the waistband system, and then connected to a lead fastener. The lead fastener is loosely affixed to the flexible cord such that it may travel along the flexible cord while it remains captured by the cord between the two attachment points on the waistband. Like the flexible cord, the fastener must have a smooth surface where it contacts the flexible cord so that it may easily slide along the length of the flexible cord. In this way, the animal can move from side to side in front of the person without placing undue stress on either the person or the animal. Also, the lead fastener may be of the "quick-on" and "quick-release" type for added convenience to the user. The combination of the two-point attachment means, the flexible cord, and the loosely-affixed fastener, all comprising the waistband system, permits hands-free exercising without the fear of a loss of balance caused by a change in direction by either the person or the animal.

The modified lead component of the present invention is also essential in the design of a device that overcomes the problems of the prior art devices. In particular, a hand-hold loop is incorporated into the lead at a point near the lead fastener described above, and it may be adjustable. This hand-hold loop modification enables the walker or jogger to quickly increase control, by hand, of the animal if necessary. The loop is placed in close proximity to the person, preferably on an adjustable lead. In prior art hands-free devices, the user must grab the lead itself, an operation made difficult by an animal in motion. The hand-hold loop of the present invention overcomes this difficulty because it enables the user to get a firm grip immediately.

The combination of the waistband system, waistband system/lead interface and the modified lead of the present invention forms an apparatus that: (1) permits a person to control an animal while at the same time leaving that person's hands and arms free to swing; (2) reduces the stress on the person and the animal caused by the movement of either one; and (3) provides for symmetrical loading of the stress by the animal on the person such that the person will not be thrown off balance by sudden directional shifts made by the animal as it moves back and forth in front of the stroller, jogger or power-walker.

DETAILED DESCRIPTION OF THE PREFERRED EMBODIMENT

Figure 1:
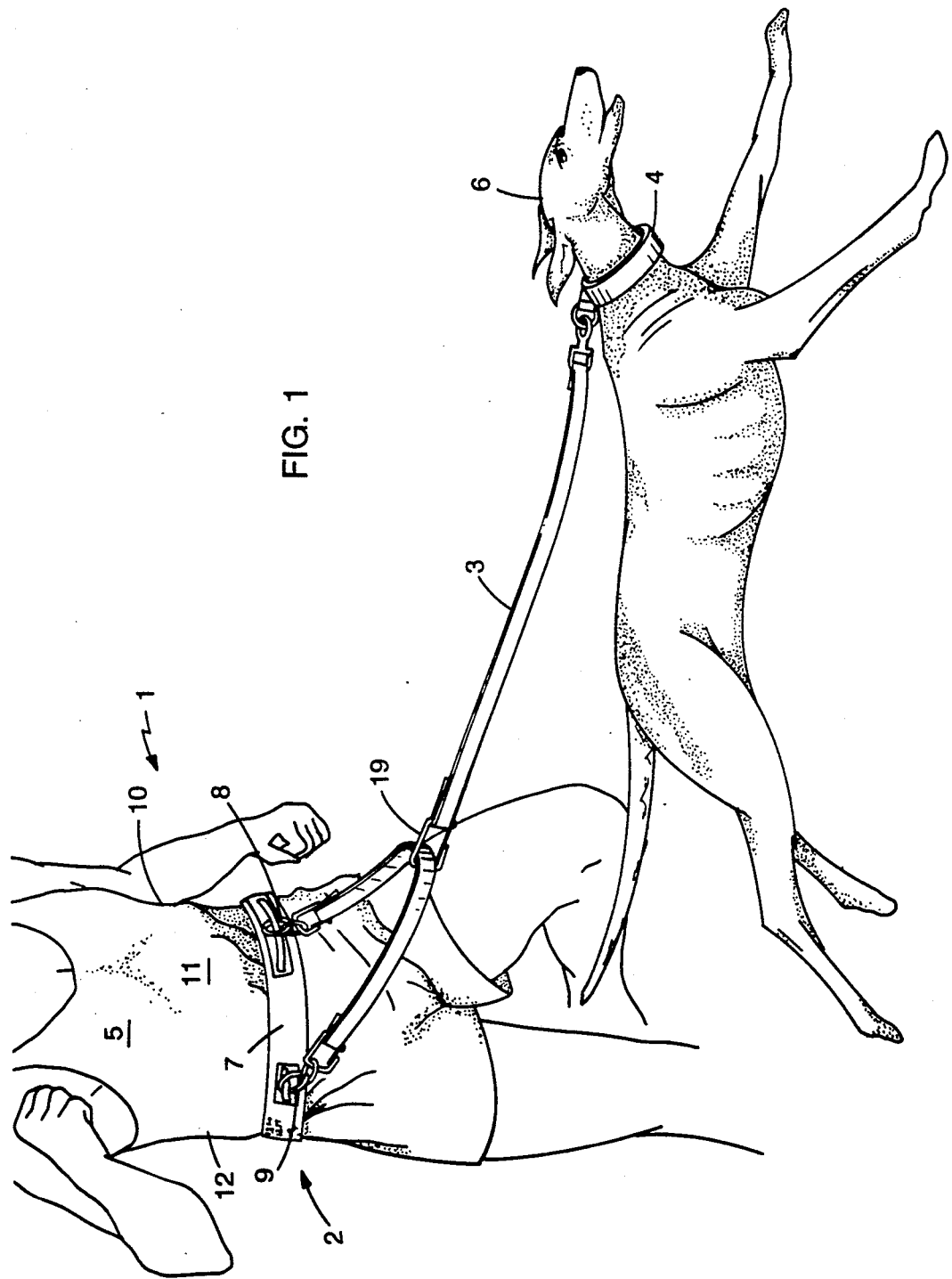
FIG. 1 is a perspective view of the preferred embodiment of the present invention.
Figure 2:
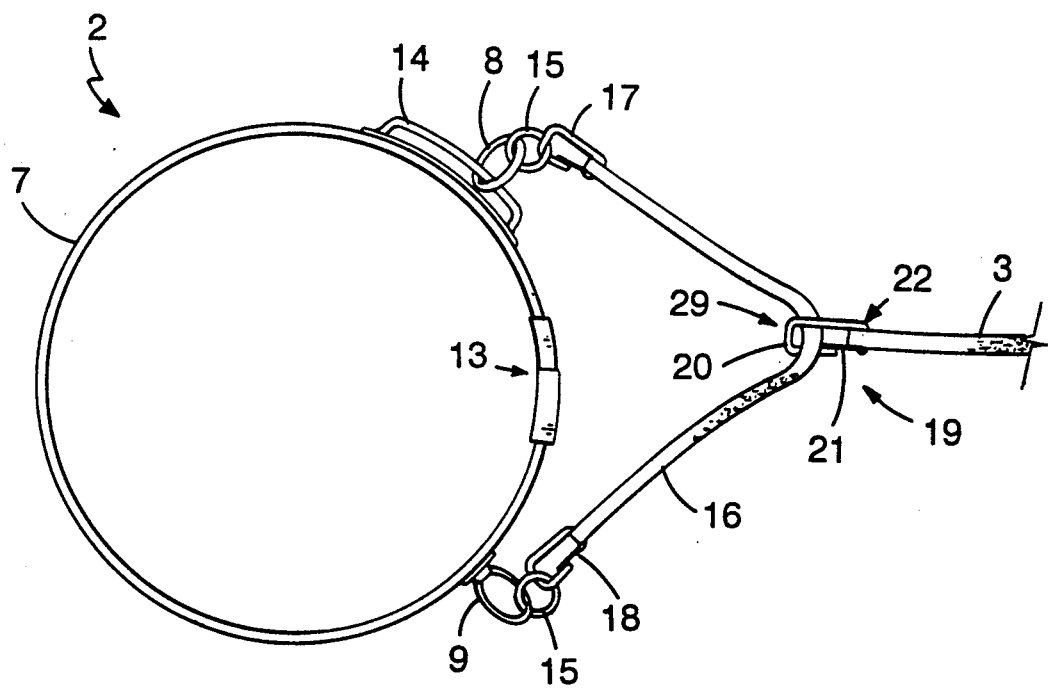
FIG. 2 is a top view of the waistband system of the present invention.

As illustrated in FIG. 1 of the drawings, a hands-free dog jogger apparatus 1 embodying the present invention comprises a waistband system 2, a modified animal lead 3 and some type of collar means. In the preferred embodiment of the invention, this collar means is a training collar 4. It is to be understood, however, that other collar means, such as a harness, may be substituted for said training collar 4 without deviating from the key features of said hands-free dog jogger apparatus 1. Said waistband system 2 is detachably affixed about a person 5 at the waist, said training collar 4 is detachably affixed to an animal, such as a dog 6, and said animal lead 3 provides an interconnection between the two. In the preferred embodiment of the present invention, and as illustrated in FIG. 2, said waistband system 2 comprises a waistband 7, a left side attachment loop 8 and a right side attachment loop 9. Said waistband 7 may be made of 2" tubular webbing, or some other type of material capable of withstanding the effects of exercising and weathering, wherein said waistband 7 is adjustable. A quick-release waistband buckle 13 secures said waistband 7 about said person 5. In the alternative, said waistband 7 may be secured with a hook-and-loop-type fastener. Affixed to said waistband 7 are said attachment loops 8 and 9. Said left side attachment loop 8 is located at approximately the midpoint between a left side 10 of said person 5 and a front 11 of said person 5. Said right side attachment loop 9 is located at approximately the midpoint between a right side 12 of said person 5 and said front 11. The specific location of either said left side attachment loop 8 or said right side attachment loop 9 may be adjusted using bar slides 14 in order to accommodate the particular characteristics of said person 5 and said animal 6. Said left side attachment loop 8 and said right side attachment loop 9 each comprises an attachment eyelet 15 by which a flexible cord 16 connects said waistband 7 to said animal lead 3. Preferably, said flexible cord 16 is some type of shock cord, has a smooth exterior, and comprises a first attachment hook 17 and a second attachment hook 18. Said first attachment hook 17 hooks to said attachment eyelet 15 of said left side attachment loop 8, and said second attachment hook 18 hooks to said attachment eyelet 15 of said right side attachment loop 9.

Figure 3:
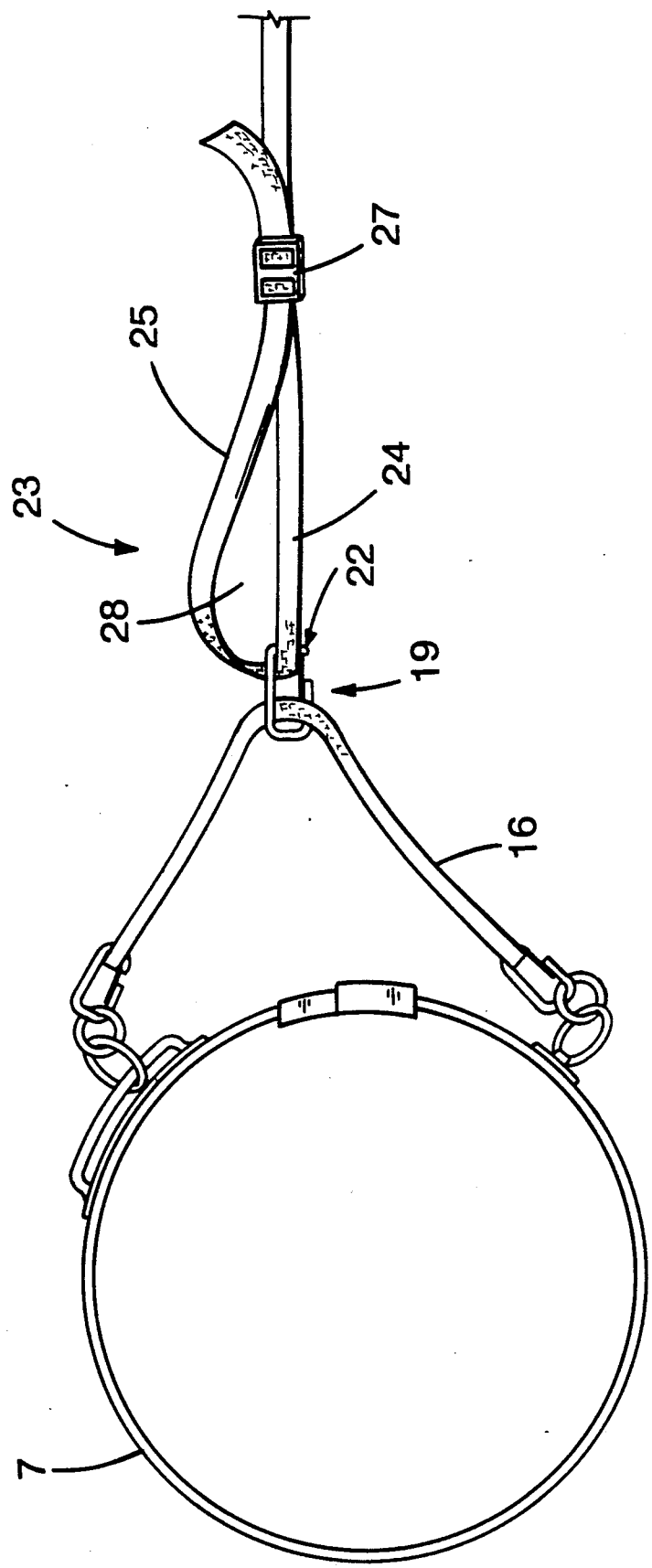
FIG. 3 is a top view of the flexible cord and animal lead interface of the invention.

Completeing the interface between said waistband system 2 and said animal lead 3, a quick-release lead clasp 19 is slidably connected to said flexible cord 16. Specifically, and as illustrated in FIG. 3, said lead clasp 19 comprises a clasp hook 20 and a clasp closure 21. A first lead clasp end 29 of said lead clasp 19 hooks onto said flexible cord 16 after said flexible cord 16 has been attached to said waistband 7. Said clasp hook 20 is permitted to slide along the length of said flexible cord 16 as said animal 6 moves back and forth in front of said person 5. Said clasp closure 21 prevents said flexible cord 16 from disengaging from said lead clasp 19. Although any generally-available type of clasp of sufficient strength and smoothness will suffice, in the preferred embodiment of the present invention said lead clasp 19 is fabricated of a rigid plastic material. Furthermore, said lead clasp 19 comprises a standard second lead clasp end 22 affixed to restraining means such as said modified animal lead 3, wherein said restraining means is fabricated of a generally available material, such as rope or cotton webbing.

Although said waistband system 2 and said flexible cord 16 comprise the primary novel features of the present invention, said animal lead 3 has been modified in order to overcome secondary problems associated with the prior art restraining devices. As illustrated in FIG. 3, at a point in close proximity to said second lead clasp end 22, a hand-hold loop 23 is incorporated into said animal lead 3. In particular, said hand-hold loop 23 comprises a first loop strap 24 and a second loop strap 25. Although as illustrated in FIG. 3 said hand-hold loop 23 provides a loop opening 28 of fixed dimension, it is to be understood that said hand-hold loop 23 may be of an adjustable type such that said loop opening 28 may be modified to accommodate various user hand sizes. Said hand-hold loop 23 provides a quick and easy means for obtaining a strong grip on said animal lead 3 when necessary. Furthermore, the length of said animal lead 3 may be increased or decreased so as to accommodate the particular users by adjusting a lead length adjuster 27.

In order to complete the user/animal friendly system of the present invention, said training collar 4 is adjustable and made of a comfortable material such as cotton webbing. Although such type of collar means is well known in the field of animal restraining devices, it is a desirable feature in the preferred embodiment of the present invention in that it further minimizes the stress placed on said animal 6 as said animal 6 accompanies said person 5 during a power-walk or jog.

Although the preferred embodiment of the present invention has been described, it is to be remembered that the above description is merely illustrative. Other methods may be employed to form the hands-free restraining apparatus of the present invention. Accordingly, it is to be understood that the present invention is not limited to that which is precisely shown and described herein.

I claim:

1. An animal-restraining device for hands-free restraint of an animal by a person as said animal accompanies said person as said person walks or jogs, said animal-restraining device comprising:
   a. a waistband system comprising
      i. an adjustable waistband detachably affixed about the waist of said person, wherein said adjustable waistband is fabricated of weather-resistant material;
      ii. a left side attachment loop and a right side attachment loop, wherein said left side attachment loop is affixed to a left side of said adjustable waistband and said right side attachment loop is affixed to a right side of said adjustable waistband and wherein said left side attachment loop and said right side attachment loop each has an attachment eyelet;
      iii. a flexible cord detachably affixed to said adjustable waistband, wherein a first attachment hook of said flexible cord hooks said flexible cord to said attachment eyelet of said left side attachment loop of said adjustable waistband and a second attachment hook of said flexible cord hooks said flexible cord to said attachment eyelet of said right side attachment loop of said adjustable waistband, said flexible cord extending about the waist of the person between said left side attachment loop and said right side attachment loop;
   b. a modified animal lead connecting said waistband system to a collar means, wherein said collar means is detachably affixed about said animal, said modified animal lead comprising:
      i. a quick-release lead clasp slidably connectable over said flexible cord, wherein a first end of said quick-release lead clasp comprises a clasp hook and a clasp closure and wherein said clasp hook is hooked over said flexible cord, said clasp hook adapted to move along said flexible cord between said left side attachment loop and said right side attachment loop in response to relative changes of position of said person and said animal as said person walks or jogs; and
      ii. restraining means, wherein a second end of said quick-release lead clasp is affixed to said restraining means and said restraining means is detachably affixed to said collar means.

2. The animal-restraining device as claimed in claim 1 wherein one of said attachment hooks of said waistband system is adjustable on said waistband.

3. The animal-restraining device as claimed in claim 1 wherein said modified animal lead further comprises a hand-hold loop affixed to said restraining means.

4. The animal-restraining device as claimed in claim 3 wherein said hand-hold loop is adjustable.

5. The animal-restraining device as claimed in claim 1 wherein said quick-release lead clasp is made of a rigid plastic.

6. The animal-restraining device as claimed in claim 1 wherein said adjustable waistband is made of tubular webbing.

7. The animal-restraining device as claimed in claim 1 wherein said collar means is a training collar.

8. The animal-restraining device as claimed in claim 1 wherein said flexible cord is a bungie cord.

9. An animal-restraining device for hands-free restraint of an animal by a person, said animal-restraining device comprising:
   a. a waistband system comprising:
      i. an adjustable waistband detachably affixed about the waist of said person, wherein said adjustable waistband is fabricated of weather-resistant tubular webbing;
      ii. a left side attachment loop and a right side attachment loop, wherein said left side attachment loop is adjustably affixed to a left side of said adjustable waistband and said right side attachment loop is affixed to a right side of said adjustable waistband and wherein said left side attachment loop and said right side attachment loop each has an attachment eyelet;
      iii. a shock cord detachably affixed to said adjustable waistband, wherein a first attachment hook of said shock cord hooks said shock cord to said attachment eyelet of said left side attachment loop of said adjustable waistband and a second attachment hook of said shock cord hooks said shock cord to said attachment eyelet of said right side attachment loop of said adjustable waistband, said shock cord extending about the waist of the person between said left side attachment loop and said right side attachment loop; and
   b. a modified animal lead connecting said waistband system to a training collar, wherein said training collar is detachably affixed about said animal, said modified animal lead comprising:
      i. a quick-release lead clasp slidably connectable over said shock cord, wherein said quick-release lead clasp is made of a rigid plastic material, wherein a first end of said quick-release lead clasp comprises a clasp hook and a clasp closure and wherein said clasp hook is hooked over said shock cord, said clasp hook adapted to move along said shock cord between said left side attachment loop and said right side attachment loop in response to relative changes of position of said person and said animal,
      ii. a rope, wherein a second end of said quick-release lead clasp is affixed to said rope and said rope is detachably affixed to said training collar; and
      iii. a hand-hold loop affixed to said rope.

* * * * *